United States Patent [19]

Buchholz et al.

[11] 3,860,160

[45] Jan. 14, 1975

[54] DUAL RECORDING AND REPRODUCING APPARATUS

[76] Inventors: James J. Buchholz, 2411 Euston Rd., Winter Park, Fla. 32789; Edward E. Peyton, 220 Glen Oaks Ave., No. 102 Temple Ter., Tampa, Fla. 33617

[22] Filed: Aug. 1, 1973

[21] Appl. No.: 384,626

Related U.S. Application Data

[62] Division of Ser. No. 169,913, Aug. 9, 1971 U.S. Patent No. 3,766,326.

[52] U.S. Cl. .................................. 226/177, 226/181

[51] Int. Cl. ............................................ B65h 17/20

[58] Field of Search ........... 226/176, 177, 181, 186, 226/187

[56] References Cited

UNITED STATES PATENTS

| | | | |
|---|---|---|---|
| 1,854,021 | 4/1932 | Derby | 226/187 X |
| 3,093,284 | 6/1963 | Mullin | 226/176 |

*Primary Examiner*—Richard A. Schacher

*Attorney, Agent, or Firm*—Duckworth, Hobby & Allen

[57] ABSTRACT

A solenoid actuated pinch roller tape drive mechanism is adjusted by loosening a locknut and rotating a solenoid plunger rod in the solenoid to thereby adjust a threaded connection between the solenoid plunger rod and a connected adjustable thread rod, thereby adjusting the spacing of a pinch roller from a drive shaft.

6 Claims, 3 Drawing Figures

DUAL RECORDING AND REPRODUCING APPARATUS

BACKGROUND OF THE INVENTION

This is a division of application Ser. No. 169,913 filed Aug. 9, 1971, now U.S. Pat. No. 3,766,326.

The present invention relates to endless tape dictation equipment for recording and reproducing from remote dictate and transcribe units and especially to such a system having the capability to dictate and transcribe from pairs of dictation and transcription units onto a pair of endless tapes, each unit being adapted to dictate or transcribe from either of the endless tapes.

In the past, various types of dictation equipment have been provided which utilized several mediums for recording and reproducing the human voice for use in dictation equipment. One common system uses magnetic tape or other flat surfaces covered with iron oxide or similar material, which can be selectively magnetized for storing and faithfully reproducing sound. Another type of dictation equipment uses records or discs which are cut in a selective manner to store dictation. In recent years the more common magnetic tape systems have begun utilizing endless tape units which can be activated from remote dictate units onto an endless belt or tape located in a central storage unit, and which endless tape can be operated from a transcribe unit at a secretary's desk whereby the secretary can start transcribing as soon as the dictation begins. One of the first units of this type is illustrated in the Nye U.S. Pat. No. 2,988,604 for Recording and Reproducing System which utilizes an endless tape feeding between a pair of bins from one bin to the other and is arranged to selectively actuate the tape in a forward or reverse direction for recording and transcribing the recorded message. This unit has been provided with improvements such as in U.S. Pat. No. 3,024,320 for a Dictating Machine Erasure Unit, and U.S. Pat. No. 3,209,974 for Storage Facilities for Ribbon-like Material. Endless tape units can also be seen in U.S. Pat. No. 2,989,594 for a Magnetic Tape Recording and Reproducing Machine, and in U.S. Pat. No. 3,347,432 for an Endless Tape Control Device, as well as in U.S. Pat. No. 3,467,790 for a Dictation-Transcription Device and in a great number of other U.S. patents directed towards improvements of these machines.

The present invention relates to endless tape dictation equipment which provides more versatility and which utilizes a series of new features especially adapted to make the apparatus easier to repair and maintain, as well as more reliable in operation over longer periods of time. It is accordingly one object of the present invention to provide two endless tapes, each of which can be operated by one or more remotely located dictation units and one or more remotely located transcribe units but both of which endless tapes have a common drive system and an integrated framework.

It is another advantage of the present invention to provide a new layout for each endless tape to provide greater flexibility and ease of operation of the system. Other advantages include a combination erase magnet for erasing each endless tape and a reed switch activated by the erase magnet; and reliable photo-cell units to indicate conditions of the endless tape; and finally, a simplified solenoid actuated tape drive which is easily adjustable by the rotation of a cylindrical solenoid plunger rod upon the loosening of a single locknut.

SUMMARY OF THE INVENTION

The present invention relates to recording and reproducing equipment and especially to dictation/transcription equipment utilizing a pair of endless magnetic tapes each of which can be operated by one or more remotely located dictation or transcription units. A framework has a pair of motors mounted thereon, one operating the transcription portion of the unit and the other operating the dictation portion of the unit, each of which motors drives both the forward and reverse capstans which capstans are adapted to drive both endless tapes simultaneously or selectively by the operation of the solenoid actuated pinch rollers pressing the tape to the capstans. Each dictate unit has a forward and reverse solenoid actuated pinch roller and each transcribe unit similarly has a forward and a reverse solenoid actuated pinch roller which are activated from the remote dictate and transcribe units by the operator of the units. Each endless tape has a single bin in which one portion of the bin provides storage for the tape ready to be recorded on which tape first passes through an erase magnet for erasing any recorded material or noise on the magnetic tape. This tape is then fed around a circuitous path over a magnetic recording head which includes in combination an erase and listen head portion. One side of the recording erase head has a solenoid driven pinch roller actuate on the endless tape in one direction while the other side has a solenoid pinch roller for actuating the endless tape in a second or forward direction. When a dictater backs up the tape, the tape drops into a second portion of its bin and the erase magnet is allowed to drop from the slack in the tape which activates a reed switch for disabling the recording section until the tape has been pulled taut again. Recording on a tape in a forward direction allows the tape to fall into a position in the bin between the ends of the bin and remains there until transcribed from the transcription unit. However, when the tape falls, it allows a photocell unit to be actuated which in turn turns on a light on the transcribe unit immediately indicating that the recorded message is ready to be transcribed. The recorded portion of the endless tape which is to be transcribed may then be actuated by the transcriber by the forward and reverse pinch rollers actuating the tape on either side of a listening head. Once the tape is transcribed it falls back into the storage bin where it is ready to be reused. If all the tape in the tape ready portion of the bin has been utilized, it will pull the tape taut covering a photocell which will activate a warning buzzer in the dictater's unit and will shut off the unit from further operation on that particular tape. It should of course be realized that both sides of the machine operate in a similar manner and if one tape has been fully used, the dictater can switch over to the other endless tape of the central unit. The solenoid activated pinch rollers are attached to levers which swing on fulcrum pins each with one end having the pinch roller thereon and the other end connected by a pin to a rod which is in turn connected to the solenoid. The rod has a threaded end threaded into a nut connected to a cylindrical plunger rod for the solenoid so that the pinch roller can be adjusted by loosening a locknut and rotating the plunger rod in the solenoid to screw the nut up or down on the threads on the rod connected to the lever, thus providing a simplified adjustment over previous systems.

BRIEF DESCRIPTION OF THE DRAWINGS

Other objects, features and advantages of this invention will be apparent from a study of the written description and the drawings, in which.

DESCRIPTION OF THE PREFERRED EMBODIMENTS

Figure 1:
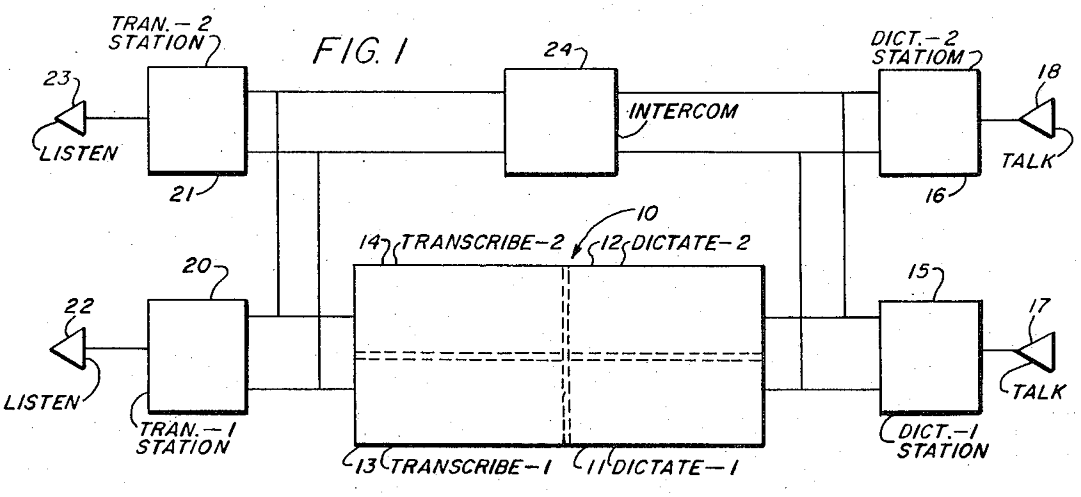
FIG. 1 is a block diagram of an overall operation of the present invention.

Referring now to FIG. 1, a block diagram is illustrated having a recording reproducing unit 10 with a first dictating unit 11 and a second dictating unit 12 along with a first transcription unit 13 and a second transcription unit 14. Both dictate units 11 and 12 are connecting to remote dictate stations 15 and 16 each of which dictate stations can operate either recording unit 11 or 12. Dictate station 15 has a mike 17 for receiving inputs and dictate station 16 has a mike 18 for receiving inputs. A pair of transcribe stations 20 and 21 are each connected to both reproducing sections 13 and 14 for receiving transcribed material from either unit and producing an output at 22 or 23. An intercom control unit 24 may also be provided with the system so that dictation system can be utilized as intercom system in an office whereby either dictater may talk through the system to the transcribing secretaries. Thus it can be seen at this point that a person operating the remote dictation control unit 15 could use the recording unit 11 while the remote dictating control unit 16 could utilize the recording unit 12, or alternatively, a single dictate station 15 could utilize recording unit 11 for routine dictation but could then switch to recording unit 12 for his priority dictation so that priority letters, or the like, could be dictated. Similarly, either transcribe station 20 or 21 can transcribe from the reproducing sections 13 and 14 interchangeably. Thus unusual flexibility is brought about in the overall combination as will be described in more detail.

Figures 2, 2A:
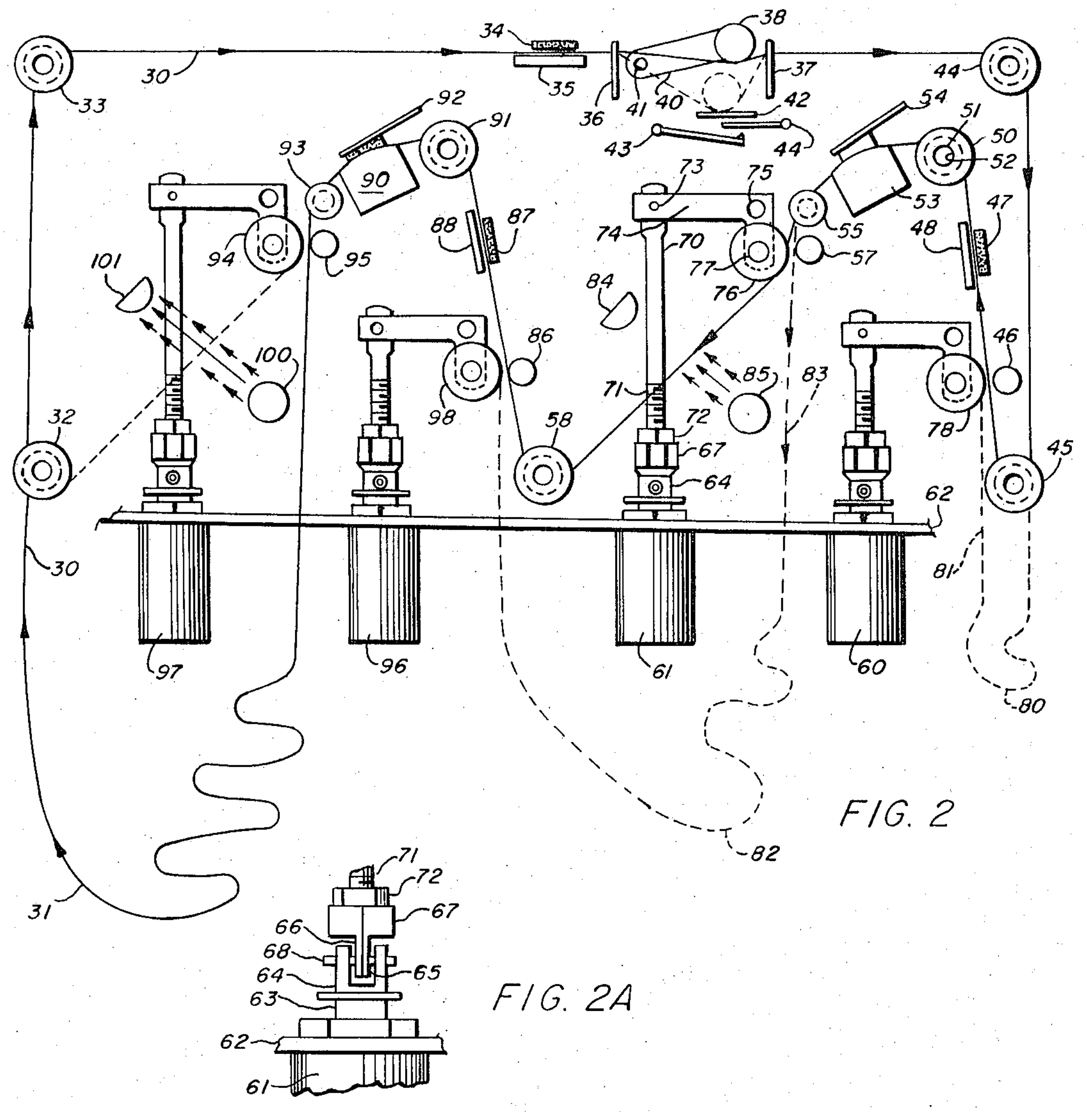
FIG. 2 is a side view of the operation of one endless tape unit of the recording/reproducing central station with parts removed for clarity of operation.
FIG. 2A is a detailed showing of a threaded means attached to the adjustable rod.

Turning now to FIG. 2 following 2A, side view of the operation of one endless tape recording reproducing system such as the first dictation and transcribe units 11 and 13 of FIG. 1 is illustrated, having an endless tape 30 located in a single large storage bin which tape is shown with arrows to illustrate the normal path of movement therethrough. Tape 30 begins in the tape ready to be recorded storage area 31 of the bin. This tape passes along a tape roller 32 around a second tape roller 33 and under a pressure pad 34 which presses down against the tape 30 which is riding on a metal bracket 35. Pressure pad 34 may be a felt pad and is used to keep the tape 30 taut at this point of the operation. The tape then passes through a pair of support brackets 36 and 37 and has a cylindrical shaped magnet 38 riding on the tape 30. Magnet 38 can of course be other shapes than cylindrical without departing from the spirit and scope of the invention and is connected to an arm 40 which is rotatably pinned by pin 41 to the frame so that when there is slack in the tape 30 at this point, the magnet 38 will force the tape down, as shown by the dashed lined. When the tape 30 is slack the magnet 38 drops into juxtaposition with a reed switch 42. The magnet 38 in its normal operation erases recorded material on the tape 30 to clear the tape for additional recording, but in its dropped position, operates to bring a pair of contacts 43 and 44 together in the reed switch. This can be accomplished in several ways depending upon the type of reed switch used and the polarity of the magnet so that the magnetic field can act on the magnetic material in contact 43 bringing it into contact with a fixed contact 44. Alternatively, it could be used to repel a flexible reed contact 44 into contact with the contact 43. Switch 42 indicates when there is slack in tape 30 at this point which indicates that a person dictating from one of the remote dictation units has reversed the tape to listen to what has been recorded. After the person dictating hangs up the handset, switch 42 disables the record head, so that recording cannot then be performed on this tape until the tape is moved forward again to bring the tape taut thereby lifting the magnet 38 into its upper or normal position shown. Thus the magnet 38 serves two purposes, first to erase the tape, and secondly to operate the reed switch 42 for disabling the recording head under predetermined conditions. Tape 30 continues around a tape roller 44 and then around tape roller 45 and over a capstan or drive shaft 46 and between a pressure pad 47 and its related metal bracket 48, which pressure pad operates in a similar manner to the pad 34. The endless tape 30 then continues around a tape guide roller 50 which rotates on a pin 51 and has an annular groove formed by the walls 52 for the tape 30 to roll on and to maintain the tape in the center of the roller 50 for alignment with the record head 53. Record head 53 also includes an erase head, erasing the tape prior to recording along with a listening head for listening to what has been recorded by backing the tape up and running it back through with the listening head activated. A pressure pad 54 maintains the tape taut over the record head 53. The tape 30 then rides in a tape guide roller 55 similar to but smaller than the roller guide 50 and then wraps around a pinch roller 56 which operates in conjunction with a second capstan or drive shaft 57. Tape 30 then continues around a tape roller 58 into the transcribe unit. The dictate portion of the recorder includes a reverse drive dictate solenoid 60 and a forward dictate solenoid 61 which solenoids are attached to a solenoid engaging bracket 62. Solenoids 60 and 61 are identical and have a cylindrical shaped plunger rod 53 which can be rotated within the solenoid 60 and 61. Each of the solenoid actuated pinch rollers of the present machine operates in the same manner, and accordingly only solenoid actuated pinch roller 61 is herein described. Each of the rods 63 has a yolk 64 attached thereto, which yolk has a clevis portion 65 for receiving a tongue 66 which is a part of a threaded unit 67. Tongue 66 is pinned to the yolk 64 by pin 68. A rod 70 has a threaded end portion 71 which is threaded into the nut 67 and locked with a locknut 72. The rod 70 is pinned with a pin 73 to an elbow shaped lever arm 74 which is fulcrummed on a shaft 75. Arm 74 has a pinch roller 76 rotatably attached to a shaft 77. Actuation of the solenoid 61 will pull the rod 63 into the solenoid thereby pulling the rod 70 in a downward motion, pulling the pin 73 which in turn pulls the arm 74 to rotate the arm 74 on pin 75 driving the pinch roller 76 against the tape 30 pressing the tape against the capstan 57 which in turn drives the tape 30 in its forward direction. Pinch roller 76 is sometimes called a clutch roller and typically may be made of rubber. The solenoid 60 operates in the same manner as solenoid 61 except for being located on the opposite side of the record head and driving the pinch roller 78 against tape 30 and against shaft 46 which drives the tape 30 in a reverse direction relative to the record head 53. Thus, a remote dictation unit can have activating switches to run the tape in a forward direction over the record head 53 erasing the tape 30, dictating or listening depending on which switches activate the solenoid 61. Similarly tape 30 can be reversed over the tape head 53 by activating solenoid 60 for reversing the tape 30 so that a portion of tape 30 that has been recorded can be listened to. Reversing the tape allows it to fall into a storage bin portion 80 as illustrated by the dashed line 81 and also allows the magnet 38 to drop, activating the reed switch 42 for blocking the operation of record portion of the record head 53 when the tape has been backed up with recorded material thereon and the person dictating from station 15 hangs up, it will prevent accidental erasure and re-record of that portion of the tape. Once material is recorded on the tape 30 it drops into a storage bin area 82 for holding fresh recorded material on the tape, as illustrated by the dashed line 83.

As soon as a dictater begins to dictate material at the remote dictation station, the endless tape 30 starts passing over the recording head and dropping into the bin portion 82 thereby removing the tape from in front of a photcell or light sensitive transistor and allowing light from a lamp 85 to reach the photocell 84 activating a switch which activates a lamp at the transcribe station indicating that material has been dictated and is ready to be transcribed. The lamp on the transcription unit will always advise a secretary when dictated material is ready for transcription as soon as dictation begins. It also will indicate on which of the endless tapes the dictation is occurring.

The endless tape 30 passes from the bin portion 82 in the transcribe portion of the unit over a capstan 86 and between a pressure pad 87 and a pad bracket 88 which pressure pad holds the tape taut over the listening head 90. The tape 30 passes over a guide roller 91 which is similar to the roller 50 and not only acts as a roller but guides or keeps the tape 30 aligned with the listening head 90. Listening head pressure pad 92 holds the tape taut onto the listening head and the tape passes a second guide roller 93 which is the same as guide roller 55 and also assists in aligning the tape 30 with the listening head. The tape then passes between pinch roller 94 and second capstan 95 and back into the bin portion 31 ready for re-use.

The transcribe portion of the unit has transcribe reverse solenoid 96 and transcribe forward solenoid 97, each of which works identical to the solenoid 61 which has already been described, and drives pinch rollers 94 and 98 respectively. Solenoid 96 drives pinch roller 98 against the drive 86 to reverse the tape so that the transcribe station can back up to re-listen to portions of tape 30 being transcribed. Solenoid 97 drives pinch roller 94 against drive shaft 95 to drive tape 30 on its forward direction. As already described in connection with solenoid 61, adjustment of these units merely requires rotating the cylindrical plunger in the solenoid after loosening a locknut to allow the rod 70 to be threaded into and out of the nut 67 and re-tightening the locknut 72. The transcribe station has a lamp 100 operating in connection with a photocell 101 which normally operates in a lighted condition because of the tape 30 dropping into the bin portion 31 out of the way of the photocell 101, but if all of tape 30 has been used in bin portion 31, as as by being dictated and dropped into bin portion 82, the tape 30 will be drawn taut around roller 32, and will block the light from lamp 100 from reaching the photocell 101 or light sensitive transistor, thereby actuating a buzzer alarm at the dictate unit indicating that all the tape on this particular endless tape has been utilized. It also deactivates or shuts off solenoid 61 so that the tape cannot be broken by the continuous forward pulling of the tape 30 when it has all been utilized. As soon as some tape can be transcribed from the portion 82 of the bin, tape will drop into bin portion 31 and removing the tape from blocking the light photocells.

The layout of the particular system as has been described for each endless tape unit ideally allows the tape 30 for three different functions to fall in three different parts of the bin and not to interfere with each other, thereby requiring only a single bin for each endless tape, while providing a great deal of flexibility to the system.

At this point, it should be clear that a novel dual endless tape for recording and reproducing has been provided for operation in connection with one or more remote dictation stations and one or more transcribe stations, and which provides many novel features but which is also adapted for use with many commercially available components such as commercial electric motors and solenoids, but having other features of which have been custom designed for the particular unit.

Accordingly, this invention is not to be construed as limited to the particular forms disclosed herein, since these are to be regarded as illustrative rather than restrictive.

I claim:

1. A tape drive mechanism adapted for use in a recording and reproducing machine comprising in combination:

a. rotatable drive shaft means for driving a tape pressed thereagainst;
b. pinch roller means adapted to press magnetic tape against said rotatable drive shaft for driving said tape;
c. lever means having two end portions and being movably attached to a point between said end portions and having said pinch roller means attached to one said end portion thereof and being adapted to swing on said lever means to engage and disengage said tape against said drive shaft means;
d. adjustable rod means movably attached to the other end of said lever means;
e. threaded means attached to said adjustable rod means for adjustment thereon; said threaded means having a protruding tongue on one side thereof for engaging a yoke on said plunger rod and said yoke and tongue are movably pinned together;
f. solenoid means having a plunger rod, said plunger rod being attached to said threaded means whereby rotation of said threaded means will rotate said plunger rod in said solenoid means for threading said rod means into and out of said threaded means and actuation of said solenoid will drive said pinch roller means toward said drive shaft.

2. The apparatus according to claim 1 in which said adjustable rod means has a lock nut threaded thereon for engagement and disengagement with said threaded means for locking said rod means against rotation in said threaded means.

3. The apparatus according to claim 2 in which said rod means is an elongated rod which is movably pinned to said lever.

4. The apparatus according to claim 1 in which said threaded means has a protruding tongue on one side thereof for engaging a yoke on said plunger rod and said yoke and tongue are movably pinned together.

5. A tape drive mechanism adapted for use in a recording and reproducing machine comprising in combination:

a. rotatable drive shaft means for driving a tape pressed thereagainst;

b. pinch roller means adapted to press magnetic tape against said rotatable drive shaft for driving said tape;

c. lever means having two end portions and being movably attached to a point between said end portions and having said pinch roller means attached to one said end portion thereof and being adapted to swing on said lever means to engage and disengage said tape against said drive shaft means;

d. rod means movably attached to the other end of said lever means;

e. solenoid means having a plunger rod; and f. threaded attachment means attached between said rod means and said plunger rod movably connecting said plunger rod and rod means, said threaded connection means having a threaded portion for adjusting the separation of said rod means and plunger rod and including a locknut for locking the adjustment between said rod means and said plunger rod and said threaded attachment means being a movable connection to allow angular movement between said rod means and said plunger rod whereby rotation of said thread connection means will adjust the position of said rod means and lever means and the spacing between said pinch roller means and said drive shaft means.

6. The apparatus according to claim 5 in which said lever means is an elbow shaped member.

* * * * *